United States Patent [19]

Noe et al.

[11] 4,347,711

[45] Sep. 7, 1982

[54] HEAT-ACTUATED SPACE CONDITIONING UNIT WITH BOTTOMING CYCLE

[75] Inventors: James C. Noe, Canoga Park; David W. Friedman, Van Nuys, both of Calif.

[73] Assignee: The Garrett Corporation, Los Angeles, Calif.

[21] Appl. No.: 172,127

[22] Filed: Jul. 25, 1980

[51] Int. Cl.$^3$ .................... F25B 13/00; F25B 27/02; F02C 7/26; F02G 3/00

[52] U.S. Cl. .................................. 62/160; 62/196 B; 62/196 C; 62/228; 62/229; 62/238.4; 62/467 PR; 60/39.14 M; 60/39.18 R

[58] Field of Search .............. 62/467 PR, 467 R, 140, 62/209, 208, 238.4, 196 B, 196 C, 228 B, 229; 60/39.18 B, 39.18 R, 39.14 M, 39.29; 415/27, 28, 49

[56] References Cited

U.S. PATENT DOCUMENTS

| | | | |
|---|---|---|---|
| 2,052,305 | 8/1936 | Karr | 62/100 |
| 2,309,165 | 1/1943 | Candor | 257/3 |
| 2,409,159 | 10/1946 | Singleton | 257/9 |
| 2,470,565 | 5/1949 | Loss | 415/27 |
| 2,471,123 | 5/1949 | Rouy | 257/9 |
| 3,135,318 | 6/1964 | Carleton | 165/29 |
| 3,139,924 | 7/1964 | Schreiner | 165/29 |
| 3,159,970 | 12/1964 | Spillmann | 60/39.18 R |
| 3,259,176 | 7/1966 | Rice et al. | 62/467 |
| 3,324,672 | 6/1967 | Sones et al. | 62/228 B |
| 3,355,903 | 12/1967 | La Fleur | 62/88 |
| 3,359,749 | 12/1967 | Howland et al. | 62/140 |
| 3,400,554 | 9/1968 | Dennis et al. | 62/238 |
| 3,407,620 | 10/1968 | Lodge | 62/159 |
| 3,487,655 | 1/1970 | Dennis et al. | 62/160 |
| 3,668,884 | 6/1972 | Nebgen | 62/510 |
| 3,822,561 | 7/1974 | Miller | 62/157 |
| 3,902,546 | 9/1975 | Linhardt et al. | 165/29 |
| 4,267,692 | 5/1981 | Earnest | 60/39.18 B |
| 4,271,664 | 6/1981 | Earnest | 60/39.18 R |

OTHER PUBLICATIONS

*Proceedings of the 12th IECEC*, Aug. 1977, pp. 172–178, D. Friedman, "Light Commercial Brayton/Rankine Space Conditioning System."

*Primary Examiner*—Albert J. Makay
*Assistant Examiner*—Harry Tanner
*Attorney, Agent, or Firm*—Henry M. Bissell; Albert J. Miller; James W. McFarland

[57] ABSTRACT

A heat-actuated space conditioning system comprising a sub-atmospheric natural-gas-fired Brayton cycle engine driving a Rankine cycle heat pump. A centrifugal Freon compressor is driven directly from the Brayton engine rotating group through a permanent magnet coupling. The system utilizes an in-line combustor which is operated to burn natural gas at atmospheric pressure by virtue of the associated sub-atmospheric Brayton cycle engine. Ambient stoichiometric air is drawn through an associated recuperator where it is preheated before being introduced into the combustor. Compressor discharge gas is also cycled through the recuperator and used as diluent to provide added flow and the desired turbine inlet temperature. Waste heat is used to power a boiler for the Freon in the Rankine cycle side, and this converted energy is used to drive a second turbine providing added power to the Freon compressor. A boiler feed pump is included which also serves as a starting mechanism for the rotating assembly.

19 Claims, 3 Drawing Figures

HEAT-ACTUATED SPACE CONDITIONING UNIT WITH BOTTOMING CYCLE

BACKGROUND OF THE INVENTION

1. Field of the Invention

This invention relates to systems for space heating and cooling and, more particularly, to such systems which are heat actuated and function as heat pumps.

2. Description of the Prior Art

Heat pumps have long been used for efficiently transferring heat from one medium to another, thus permitting the heating or cooling of a given space with the heat being transferred from some readily available medium (ambient air, water in an adjacent lake or well, a body of rocks or salt, or the like) for heating, and being delivered to the medium (often the same body of water, etc.) for cooling.

For example, the Carleton U.S. Pat. No. 3,135,318 describes a heat pump system using a turbo-compressor which provides power and waste heat to a standard vapor cycle refrigeration system. Two turbines are employed in the system, one driving the turbo-compressor and a second turbine driving a recirculating air fan and the refrigerant compressor.

The Miller U.S. Pat. No. 3,822,561 describes a self-contained, portable air cooling unit comprising a refrigeration circuit, a thermal reservoir consisting of an ice bank in a flexible tank, and a heat exchanger for transferring heat between the air in the space to be cooled and chilled water circulated from the ice bank and reservoir. Means are provided to selectively and alternatively operate the refrigeration circuit and the circulating system to heat or to cool the space as desired.

The Lodge U.S. Pat. No. 3,407,620 describes a system for heating and cooling using a recirculating water loop. Heating is supplied by a standard heater using combustible fuel, and cooling is provided by a cooling tower. Although the patent represents the system as a heat pump, it is not a heat pump by the usual thermodynamic definition.

The La Fleur U.S. Pat. No. 3,355,903 describes a closed reverse-Brayton-cycle refrigeration system to prvide refrigeration for air liquefaction. Repetitive stages of compression and cooling are employed.

A heat-actuated space conditioning system utilizing a Brayton engine is described in an article entitled "Light Commercial Brayon/Rankine Space Conditioning System" by David Friedman, beginning at page 172 of the August, 1977 Proceedings of the 12th IECEC (Intersociety Energy Conversion Engineering Conference). This article describes a Brayton cycle system utilizing a combustor driving a turbo-compressor, the latter being magnetically coupled to a second compressor in an associated Rankine cycle system.

The Linhardt et al U.S. Pat. No. 3,902,546 describes a system utilizing a gas turbine driving a Freon compressor for refrigeration with an air cycle heat pump connected to the Freon cycle through a hydraulic coupling which permits decoupling at different parts of the operating cycle.

The Dennis et al U.S. Pat. Nos. 3,400,554 and 3,487,655 describe equipment using a Rankine power cycle in a Freon air conditioning system. A turbine and a compressor are coupled together through a magnetic coupling incorporating a stationary impervious membrane between the rotating components of the coupling for sealing purposes.

U.S. Pat. Nos. 2,309,165 of Candor and 3,139,924 of Schreiner describe systems utilizing internal combustion engines driing a Rankine cycle heat pump. U.S. Pat. Nos. 2,471,123 of Rouy and 2,409,159 of Singleton describe air conditioning systems similar to those which are currently configured on present day aircraft. The Rouy patent device uses a Brayton power cycle integrated with a bootstrap compressor to power the unit, once it is started. These systems can be used for either heating or cooling.

SUMMARY OF THE INVENTION

In brief, arrangements in accordance with the present invention comprise a Brayton cycle engine coupled to drive a Rankine cycle heat pump. The Brayton cycle engine is energized by the burning of natural gas and includes a combustor, a turbine and compressor on a common shaft, and a recuperator. The turbo-compressor shaft is coupled through a permanent magnet, non-slip coupling to drive a centrifugal Freon compressor. Indoor and outdoor heat exchanging coils are connected in circuit with the Rankine cycle compressor and controlled by a switching valve for operation in heating and cooling modes. What would ordinarily be waste heat in the Brayton cycle circuit is transferred to the Rankine cycle circuit by way of a boiler and this energy is, in one arrangement, used to power a second turbine installed on the shaft of the rotating machine unit to provide shaft power to assist in driving the Freon compressor. A boiler feed pump is used to direct the liquid Freon to the boiler, and may also be used for start-up by providing pressurized Freon to the additional turbine to start the rotating machinery unit and bring the system up to a point at which the combustor can be lit off.

In an alternative arrangement in accordance with the invention, the turbine which is powered by pressurized Freon evaporated in the boiler is used to drive a generator to provide electricity for powering the various heat exchanger fans and as a source of power for auxiliary electrical equipment.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENTS

Figure 1:
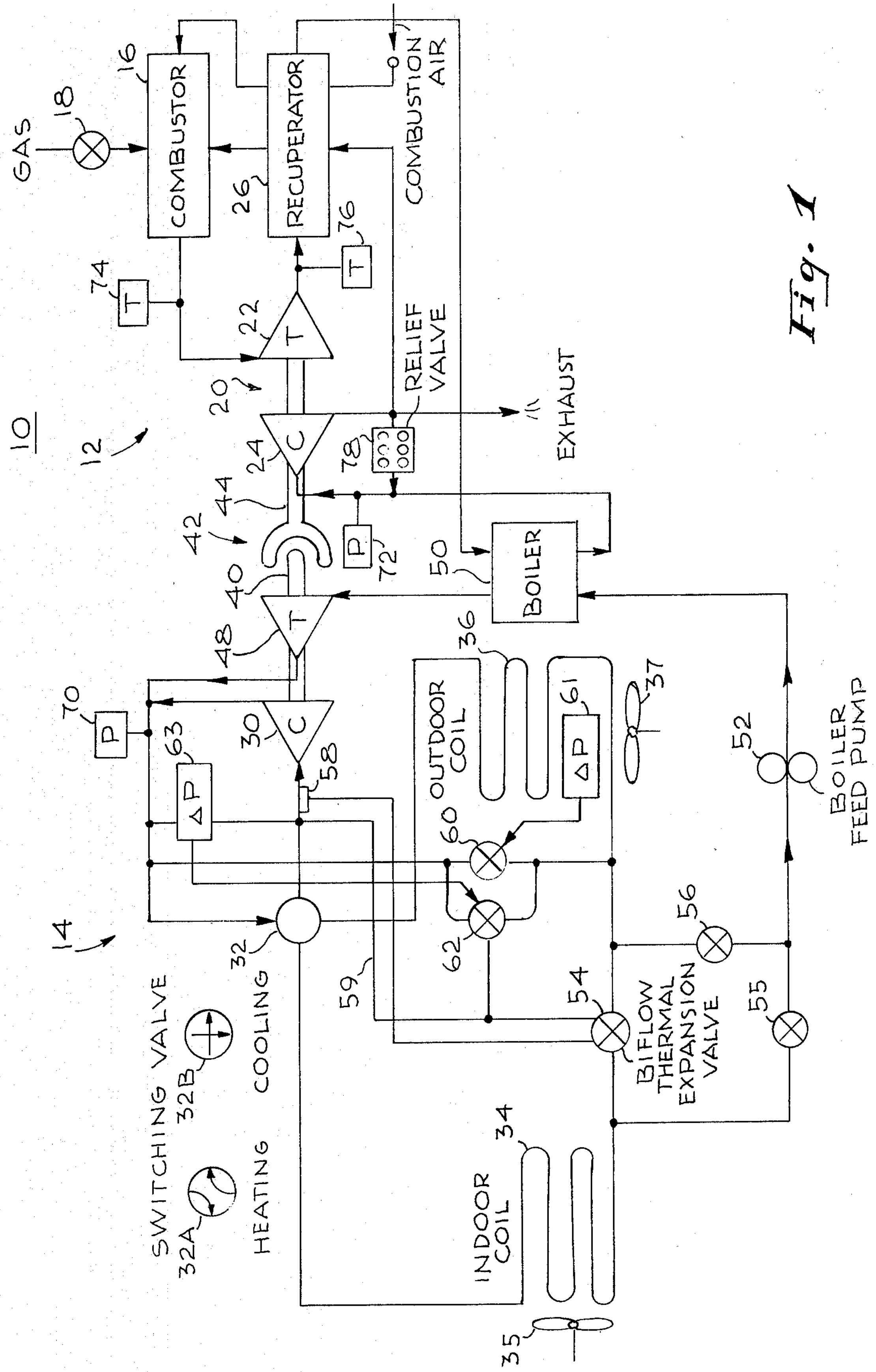
FIG. 1 is a schematic diagram of one particular arrangement in accordance with the invention.

As shown in FIG. 1, a heat-actuated, space conditioning unit 10 in accordance with the invention comprises two major portions, a Brayton cycle portion 12 and a Rankine cycle portion 14. The Brayton cycle portion 12 is shown comprising a combustor 16 coupled via valving 18 to a gas supply line. The combustor is in series circuit with a turbo-compressor 20 comprising a first turbine 22 and a first compressor 24, together with a recuperator 26. The combustor 16 is of the in-line atmospheric type fired by natural gas. Combustion air is drawn in through the recuperator 26 in amounts sufficient to provide stoichiometric burning in the combustor 16. Passage through the recuperator 26 preheats the ambient air prior to introduction into the combustor.

Compressor discharge gas is also cycled through the recuperator and is used as a diluent to provide added flow and to quench combustor flame temperature to develop the desired turbine inlet temperature for the first turbine 22. Expansion of the combustor exhaust gas takes place through the first turbine 22, where sufficient power is developed to drive the associated compressors. The discharge gas from the turbine 22 is at sub-atmospheric pressure and is processed through the recuperator 26, where it preheats the combustor inlet air and compressor discharge gas.

The Rankine cycle portion 14 comprises a vapor compressor 30, a switching valve 32, an indoor coil heat exchanger 34 and an outdoor coil heat exchanger 36. The vapor compressor 30 is mounted on a shaft 40 which is magnetically coupled by a magnetic coupling 42 to a shaft 44 of the turbo-compressor 20. A second turbine 48, also mounted on the shaft 40, is coupled to receive pressurized Freon from a boiler 50 which is connected in the Brayton cycle circuit 12 to convert waste heat from the Brayton cycle to a form used to power the turbine 48, thereby reducing the shaft power requirements imposed on the turbo-compressor 20 of the Brayton cycle circuit. Liquid Freon is supplied to the boiler 50 by a boiler feed pump 52.

Each of the heat exchangers 34, 36 is provided with an associated fan 35 or 37 for directing air flow across the heat exchanging coils. A biflow thermal expansion valve 54 is connected between the outdoor and indoor coils 36 and 34. The thermal expansion valve 54 is controlled by a temperature sensor 58 at the inlet of the compressor 30 and also responds to the pressure in a pressure equalizer line 59, also coupled to the inlet of the compressor 30. A hot gas by-pass valve 60 and a compressor surge valve 62 are connected in parallel between the output of the compressor 30 and the inlet of the outdoor coil 36, the surge valve 62 being also connected to the pressure equalizer line 59. Valves 55 and 56 are connected as shown to direct the liquid refrigerant to the boiler feed pump 52, regardless of the mode of operation of the Rankine cycle system. Valve 55 is operated open in heating and closed in cooling whereas the valve 56 is maintained opened in cooling and closed in heating, the purpose being to always permit liquid refrigerant to be directed to the inlet side of the boiler feed pump 52.

The hot gas by-pass valve 60 is controlled by a sensor 61 which is positioned in the air duct for the outdoor coil 36 in order to sense a buildup of differential pressure across the air duct which would be caused by a buildup of frost on the outdoor coil when the system is operating in the heating mode. Under such conditions, the differential pressure sensor 61 causes the by-pass valve 60 to open and thereby inject hot gas upstream of the outdoor coil, thereby causing it to defrost.

The surge valve 62 is controlled by a differential pressure sensor 63 connected between the inlet and outlet of the compressor 30. The surge valve 62 serves to protect the compressor 30 when it is operating at lower speeds, below the surge line, at which it is most likely to start surging and could ultimately destroy itself. Under surge conditions, the compressor acts almost like a cavitating pump and is subject to damage if the condition is not relieved. The differential pressure sensor 63 is a fast-operating circuit which serves to detect the beginning of a surge impluse across the compressor 30 and, in response, opens the valve 62 to increase the flow of gas through the compressor by relieving the back pressure at the compressor outlet.

The two circuits 12 and 14 are also provided with various temperature and pressure sensors. For example, the Rankine cycle circuit 14 includes a pressure sensor 70 connected to the output of the compressor 30. A similar pressure sensor 72 is coupled at the inlet of the compressor 24 in the Brayton cycle circuit 12. The Brayton cycle circuit also includes temperature sensors 74, 76 at the input and output sides of the turbine 22 and a relief valve 78 connected across the compressor 24. The various pumps and fans, such as the boiler feed pump 52 and the fans 35, 37 for the Freon heat exchanger, are driven by associated electric motors (not shown).

Figure 2:
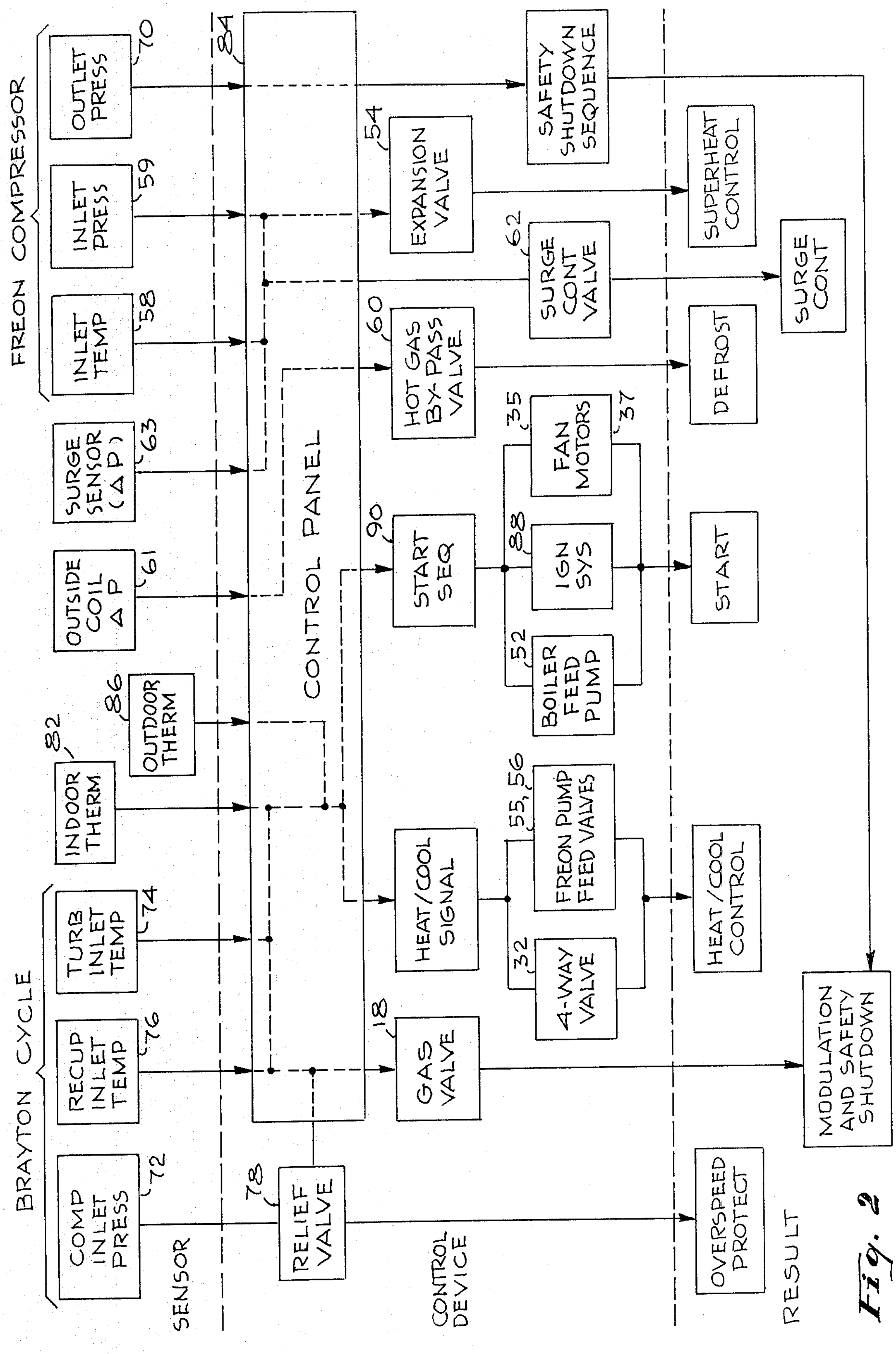
FIG. 2 is a block diagram illustrating a control system associated with the present invention.

FIG. 2 is a conceptual block diagram illustrating the control portion of the space conditioning system 10 of FIG. 1 and shows the various sensors involved, the devices which they control, and the results of such operation.

As indicated in FIG. 2, the control circuitry for the system of FIG. 1 includes a modulating gas valve 18 supplying gas to the combustor 16 (see FIG. 1). The control of the gas valve 18 is effected by comparison of the temperature of the conditioned space to that desired. Thus, the gas valve 18 is controlled by a load demand signal from the indoor thermostat 82 which, together with signals from the other sensors associated with the system, is supplied to a control panel 84 for routing and possible combination with signals from other sensors similarly connected. In response to the load demand signal from the indoor thermostat 82 the gas valve 18 modulates the gas flow to the combustor 16. The rate of gas flow thus supplied will in turn control the combustor discharge temperature, which is the temperature at the inlet of the turbine 22 as sensed by the temperature sensor 74. The resultant temperatures control the power and speed provided to the Rankine cycle for modulation of heating and cooling capacity.

The relief valve 78 in the Brayton engine circuit 12 provides over-speed control by loading the compressor 24 with excess flow if speeds greater than the design speed of 80,000 rpm are obtained. The relief valve 78 is activated in response to signals from the pressure sensor 72 at the inlet to the compressor 24 and may also be controlled by the signals in the control panel 84 for modulating the gas valve 18.

The indoor thermostat 82 and an outdoor thermostat 86 are connected to control the switching valve 32 in the heating or cooling mode of operation. The thermostat 82 controls both the heating and cooling modes, subject to being overridden by the hot gas by-pass valve 60 in the event that the outside coil 36 requires defrosting, a condition which is sensed by the differential pressure sensor 61.

As previously described, the surge sensor 63 detects the beginning of a surge condition in the Rankine cycle compressor 30 and causes the surge control valve 62 to open, thereby relieving the pressure at the outlet of the compressor 30 and protecting the compressor from damaging or destroying itself.

The control panel 84 is provided with line input voltage and receives safety override signals from various ones of the sensors that are provided to protect the equipment of FIG. 1. Thus the turbine inlet temperature sensor 74 and recuperator inlet temperature sensor 76 are coupled to the control panel 84 to operate the gas valve 18 in the event that the gas flow to the combustor 16 should be modulated or shut off for safety of the equipment. In addition, the inlet temperature sensor 58 and the inlet pressure sensor 59 of the Freon compressor 30 are coupled to provide control for the surge valve 62 and the expansion valve 54 to provide surge control and superheat control, respectively. The outlet pressure sensor 70 at the outlet of the compressor 30 also provides a signal for the safety shutdown sequence of the system.

The control panel 84 is also provided with 220/440 volt power to direct power to the boiler feed pump 52, the fan motors 35, 37 and the ignition system 88 for the combustor 16. This is controlled in response to a predetermined starting sequence by the load demand and heat/cool signals generated by the thermostats 82, 86.

The starting sequence, represented by the control block 90, begins by energizing the boiler feed pump 52 when a load demand signal from the indoor thermostat 82 signals that the system is to be started. The boiler feed pump 52 pumps liquid refrigerant through the boiler 50 where evaporation will occur and pressure builds up to drive the turbine 48. This turns the shaft 40 and thus begins to drive the compressor 30. Through the coupling 42, the turbo-compressor 20 of the Brayton cycle engine also begins to turn. When the appropriate flow of air through the combustor 16 is reached, the gas valve 18 is opened and the ignition system 88 is energized to ignite the gas in the combustor 16. The ignition system 88 includes conventional controls for the pilot and main gas valves in the combustor 16. The ignition system 88 is provided with line input voltage, nominally 115 volts, and operates in conventional fashion in response to a flame and pilot proof detector (not shown) to disable the pilot and the gas valve 18 in the event that the pilot is extinguished.

In operation, a flow of gas through the modulating valve 18 is supplied to the combuster 16 where it is mixed with preheated ambient air to provide a combustor output in accordance with system demand. Recycled, combusted air is also supplied through the recuperator 26 to serve as a diluent to limit temperature at the inlet of turbine 22. Combustor exhaust gas expands through the turbine 22 which drives the shaft 44 and compressor 24. This drives the line extending from the outlet of the turbine 22 to the inlet of the compressor 24 to a sub-atmospheric pressure level, thus permitting the combustor to operate at pressures very near atmospheric and thereby simplifying the controls and other equipment which are required for proper operation of the combustor. Power from the turbo-compressor 20 is also supplied to the vapor compressor 30 in the Rankine cycle circuit through the non-slip magnetic coupling 42. Operation of the Rankine cycle circuit 14 is conventional for a vapor compression, heat pump system using as its power source the centrifugal compressor 30 rather than a conventional positive displacement pump. Direction of flow through the indoor and outdoor coils 34, 36 is reversed for heating and cooling modes, as shown by the symbols 32A and 32B for the switching valve 32 selecting the heating and cooling modes, respectively.

The magnetic coupling 42 between the turbo-compressor 20 and the shaft 40 driving the compressor 30 in the refrigeration cycle is similar in concept and function to the magnetic coupling shown and described in the above-mentioned Dennis et al U.S. Pat. No. 3,400,554. The turbo-compressor 20 comprises a single-stage radial turbine 22 and a single-stage radial compressor 24, bolted back-to-back to the shaft 44 to form an integral rotating assembly. The shaft 44 is supported by long-life, maintenance-free, compliant-foil journal bearings (not shown) which operate in conventional fashion. Foil thrust bearings (also not shown) are located between the journal bearings and are cooled and lubricated in similar fashion. Six-pole male and female coupling magnets, as shown in the Dennis et al patent, are connected to the respective shafts 40 and 44. A sealing diaphragm, also as shown in the Dennis et al patent, is constructed of plastic and serves as a hermetic barrier between the two coupling magnets.

The recuperator 26 is of formed tube sheet construction and utilizes a core of alternate layers of gas and air fins brazed to the tube sheets for maximum heat transfer and structural strength. A heat exchanger of this type is disclosed in U.S. Pat. No. 4,073,340 of Kenneth O. Parker, assigned to the assignee of this invention.

Figure 3:
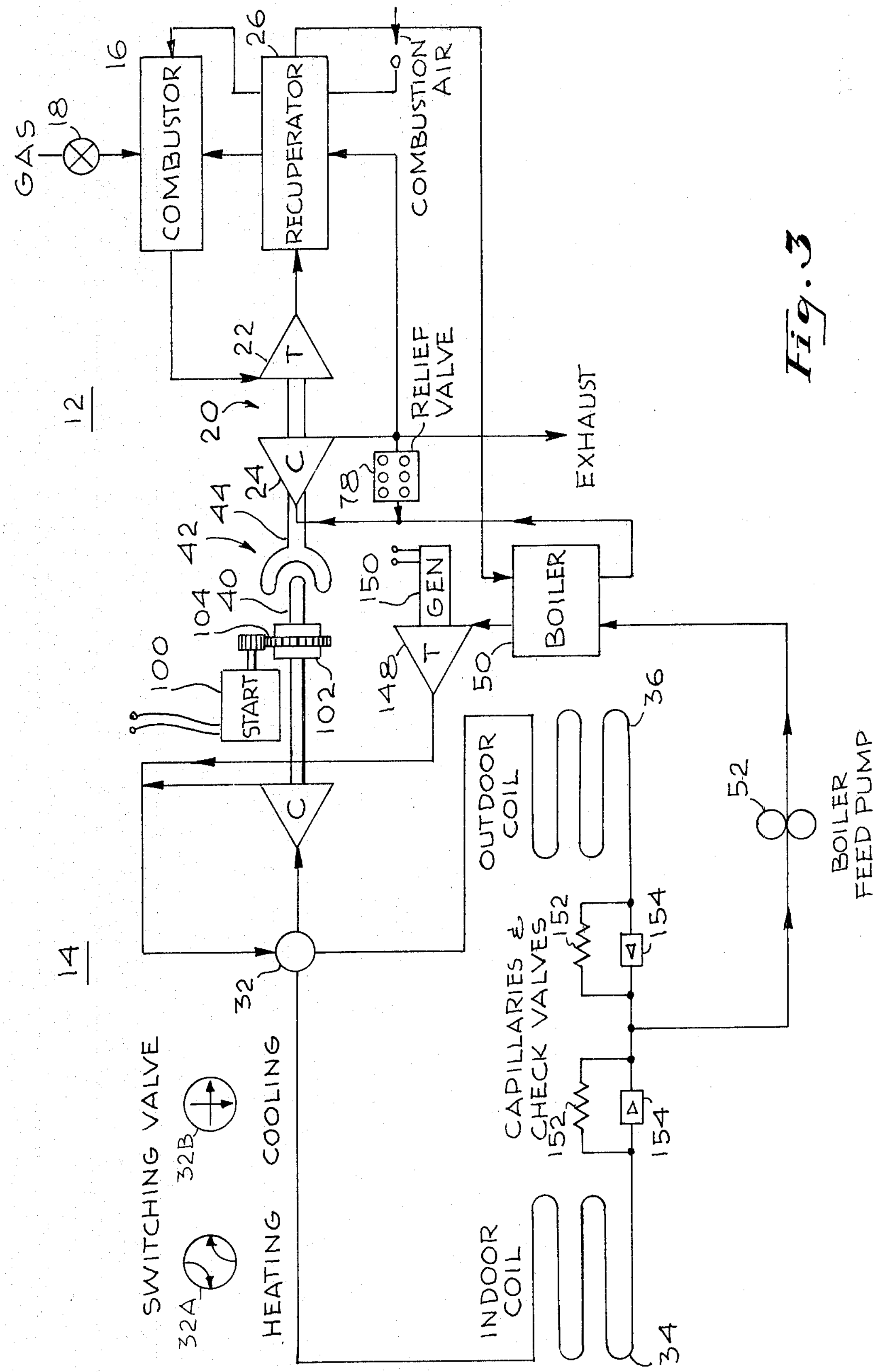
FIG. 3 is a schematic diagram illustrating a second particular arrangement in accordance with the invention.

An alternative arrangement in accordance with the present invention is shown in FIG. 3 which illustrates, in schematic block diagram form, a system similar to the system 10 of FIG. 1. In FIG. 3, like reference numerals have been used to designate corresponding elements. In the arrangement of FIG. 3, the waste heat from the Brayton cycle portion 12 is applied to the Freon boiler 50, as in FIG. 1. However, the vaporized Freon from the boiler 50 is applied to a separate turbine 148 which is used to drive a high speed, permanent magnet generator 150, instead of being coupled to the shaft 40 driving the compressor 30. This system thus places additional load on the Brayton engine 20 which must now supply all of the shaft power to drive the Freon or refrigerant compressor 30, but it also provides a self-contained unit in that the electricity to power the fans and pumps included in the system is generated by the generator 150 driven by the turbine 148. If desired, this system can also provide some electricity for auxiliary power and lighting.

FIG. 3 shows a different starting arrangement from that of FIG. 1. In FIG. 3, a starter motor 100 is shown coupled to a clutch device 102 by gears 104. The clutch 102 may be selectively coupled to the shaft 40, as by an overspeed release mechanism, in order to initiate engagement of the starter motor 100 to the shaft 40 and to disengage the drive coupling when the shaft 40 is brought up to the lower range of operating speed. The starter motor 100 may be electrically powered, in which case it may draw power from a storage battery source (not shown) coupled in the system of auxiliary power that is coupled to the generator 150. Alternatively, if desired, the starter motor 100 may be pneumatically driven from a differential pressure source (not shown).

The system of FIG. 3 is also shown with capillaries 152 and check valves 154 connected in place of the expansion valve 54 of FIG. 1. As is known in the art, such elements are equivalent in function and do not constitute a part of the present invention.

By virtue of the arrangements in accordance with the present invention as shown in the accompanying drawings and described hereinabove, a particularly effective and efficient heat-actuated space conditioning system may be realized. The system is redily effective over ambient temperature ranges of temperate weather zones such as are encountered in most of the United States. The operation of the Brayton cycle engine at sub-atmospheric pressure levels advantageously permits the combustor to be considerably simplified because it can operate at near atmospheric pressures. The design of the system is directed to a cooling load range of from approximately 7.5 to 25 ton capacity and the efficiency of the system and its attendant fuel economies are such as to realize a pay-out period of two to three years at current fuel costs.

Although there have been described above specific arrangements of a heat-actuated space conditioning unit with bottoming cycle in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. Space conditioning apparatus comprising:

a Brayton cycle circuit including a combustor and a turbo-compressor comprising a turbine coupled to the output of the combustor for expanding combustor exhaust to sub-atmospheric levels and driving an associated compressor mounted together with the turbine on a single shaft;

a recuperator connected to the outlet of the turbine for preheating combustion air supplied to the combustor, the exhaust gas flow outlet of the recuperator being connected to the inlet of the compressor;

a Rankine cycle heat pump circuit comprising indoor and outdoor heat exchanger coils, a centrifugal compressor coupled to a compressor drive shaft for directing refrigeration fluid through the coils, and a transfer valve for selecting operation of the system in the heating or cooling mode;

means for deriving power to drive the Rankine cycle compressor from the Brayton cycle circuit including a bidirectional coupling for driving one shaft from the other shaft;

means for developing useful power from waste heat in the Brayton cycle circuit including a boiler interconnecting the Brayton cycle circuit and the Rankine cycle circuit to vaporize the refrigeration fluid from waste heat in the Brayton cycle circuit, and a second turbine coupled to the compressor shaft and connected to the boiler to be driven by the pressurized refrigeration fluid; and means for starting the apparatus prior to firing off the combustor by pumping refrigerant fluid to the second turbine to initiate rotation of the turbo-compressor through the coupling.

2. The apparatus of claim 1 wherein the starting means comprises a boiler feed pump connected to the refrigeration cycle circuit between the indoor and outdoor coils for supplying the refrigeration fluid in liquid form to the boiler under pressure.

3. The apparatus of claim 2 wherein the second turbine includes an inlet connected to receive vaporized refrigeration fluid from the boiler and an outlet connected to the outlet of the Rankine cycle compressor.

4. The apparatus of claim 3 wherein the second turbine is mounted on a common shaft with the Rankine cycle compressor to provide auxiliary driving power to the compressor.

5. The apparatus of claim 2 wherein the starting means includes means for driving the boiler feed pump to pressurize the refrigeration fluid system and power the second turbine.

6. The apparatus of claim 5 wherein the second turbine is mounted on the compressor shaft to drive the compressor shaft and compressor.

7. The apparatus of claim 1 further including means for switching the Rankine cycle circuit between heating and cooling modes of operation, the switching means being connected at the outlet of the Rankine cycle compressor to direct compressed fluid from that compressor to the indoor coil in the heating mode and to the outdoor coil in the cooling mode.

8. The apparatus of claim 1 further comprising a surge valve connected between the inlet and outlet of the Rankine cycle compressor, and means responsive to the pressure differential across that compressor to open the surge valve upon the development of a surge condition in the compressor.

9. The apparatus of claim 7 further comprising a second valve connected between the outlet of the Rankine cycle compressor and the end of the outdoor coil which is remote from the mode switching means, and means responsive to a predetermined pressure differential in ambient air being driven across the outdoor coil for controlling the second valve to direct heated refrigeration fluid from the compressor to defrost the outdoor coil.

10. The apparatus of claim 1 wherein the Brayton cycle circuit includes means defining a flow path for exhaust gas from the combustor to the turbo-compression turbine, thence to the recuperator, and from the outlet of the recuperator through the hot side of the boiler to transfer waste heat to the Rankine cycle circuit.

11. The apparatus of claim 10 wherein the Brayton cycle circuit gas flow path further includes means directing gas flow from the boiler to the inlet of the turbo-compressor compressor for pressurization to atmospheric pressure level, thence to the recuperator for heat transfer with the exhaust from the turbine, and finally to the combustor for addition to the combusted gases therein as a diluent.

12. The apparatus of claim 11 further comprising means for exhausting a portion of the gas from the outlet of the turbo-compressor compressor so that only a part of the gas circulating in the Brayton cycle circuit is re-introduced into the combustor as diluent.

13. The apparatus of claim 11 further comprising a relief valve connected across the compressor of the turbo-compressor combination and pressure sensing means connected at the inlet of that compressor for controlling the relief valve.

14. The apparatus of claim 1 further including means for controlling flow of fuel supplied to the combustor in accordance with the temperature of the conditioned space relative to outside temperature and a selected indoor temperature setting.

15. The apparatus of claim 14 wherein the fuel controlling means includes means for sensing indoor and outdoor temperatures, comparing the sensed temperature levels relative to the selected indoor temperature setting, and modulating a gas valve for supplying gas to the combustor in accordance with the result of said comparison.

16. The method of conditioning a space by heating or cooling relative to outside ambient temperatures comprising the steps of:

coupling a rotary compressor to drive a refrigerant fluid in a Rankine cycle circuit through indoor and outdoor heat exchanging coils;

driving the compressor by means of a hermetically sealed magnetic coupling from the shaft of a turbo-compressor operated in an associated Brayton cycle circuit;

developing useful power from the waste heat of the Brayton cycle circuit by coupling the waste heat to evaporate the refrigerant fluid in the Rankine cycle circuit and direct the evaporated fluid to a second turbine; and prior to lighting the burner of the Brayton cycle circuit, initiating the operation of the system by pumping refrigerant fluid to drive the second turbine and thereby initiate rotation of the turbo-compressor and gas flow in the Brayton cycle circuit to a point where it is safe to fire up the Brayton cycle system.

17. The method of claim 16 further including the step of coupling the second turbine directly to the shaft of the Rankine cycle compressor to provide additional shaft power.

18. The method of claim 16 further comprising the step of protecting the Rankine cycle compressor against surge conditions by detecting the onset of a surge condition and bleeding refrigeration fluid directly from the outlet to inlet of the compressor to terminate the surge condition.

19. The method of claim 16 further comprising the step of sensing the buildup of frost on the outdoor coil and bleeding fluid from the outlet of the Rankine cycle compressor to the outdoor coil to eliminate the frost.

* * * * *